United States Patent [19]

Shoshi et al.

[11] Patent Number: 5,633,079
[45] Date of Patent: May 27, 1997

[54] HARD COAT FILM HAVING AN EASILY SLIPPING PROPERTY AND PROCESS FOR PRODUCING THE SAME

[75] Inventors: Satoru Shoshi; Shunpei Watanabe; Takanori Saito, all of Saitama-ken, Japan

[73] Assignee: Lintec Corporation, Tokyo, Japan

[21] Appl. No.: 398,999

[22] Filed: Mar. 6, 1995

[30] Foreign Application Priority Data

May 25, 1994 [JP] Japan .................. 6-135074

[51] Int. Cl.$^6$ .................. C08L 67/02; C08L 33/02; C08L 33/08
[52] U.S. Cl. .................. 428/323; 428/337; 428/332; 428/480; 428/500; 525/165; 525/176; 525/418; 525/451
[58] Field of Search .................. 428/323, 327, 428/332, 480, 500; 525/165, 176, 418, 451

[56] References Cited

U.S. PATENT DOCUMENTS

| 4,895,830 | 1/1990 | Takeda et al. | 503/277 |
| 5,401,559 | 3/1995 | Okamoto et al. | 428/143 |

*Primary Examiner*—W. Robinson H. Clark
*Attorney, Agent, or Firm*—Young & Thompson

[57] ABSTRACT

A hard coat film having an easily slipping property which comprises a plastic film and a hard coating layer of 1 to 15 μm thickness made from an ultraviolet curable resin on the plastic film, wherein the hard coating layer contains particles of a high molecular weight polyester resin dispersed therein and the surface of the hard coating layer is provided with 3 to 200 protrusions of a diameter of 0.05 to 3 μm and a height of 0.01 to 2 μm per 100 μm$^2$ of the surface, and a process for producing the hard coat film. The hard coat film has a low haze value, a good transparency, an excellent resistance to scratch, a low kinematic friction coefficient, and an excellent slipping property both between coated surfaces and between a coated surface and a surface having no treatment.

10 Claims, 1 Drawing Sheet

HARD COAT FILM HAVING AN EASILY SLIPPING PROPERTY AND PROCESS FOR PRODUCING THE SAME

BACKGROUND OF THE INVENTION

1. Field of the Invention

The present invention relates to a hard coat film having an easily slipping property and a process for producing the hard coat film. More particularly, it relates to a hard coat film having an excellent slipping property both between coated surfaces and between a coated surface and a surface having no treatment in addition to an excellent hardness of the surface, and a process for producing the hard coat film.

2. Description of the Related Art

As the method of providing a plastic film with an easily slipping property, the method of coating the plastic film with a coating material containing an inorganic filler, such as silica as the representative example, or an organic filler, such as polyethylene powder and polycarbonate powder, and the method of coating the plastic film with a coating material containing a silicone additive, are well known. However, the method using the coating material containing an inorganic or organic filler has a drawback in that the haze value of the plastic film increases or appearance of the plastic film is inferior. The method of using the coating material containing a silicone additive has a drawback in that the easily slipping property is not exhibited between coated surfaces even though the slipping property between a coated surface and a surface having no treatment is improved.

Hard coat films used as protecting plates for displays are provided with hard coating layers on both surfaces of a plastic film. Hard coat films used as polarizing plates on liquid crystal cells are provided with a hard coating layer on one surface of a plastic film, and then treated with saponification for increasing affinity to water. In continuous processes for these treatments, there arise problems such as blocking between coated surfaces or between a coated surface and a surface having no treatment, and irregular winding of the film on a roll. Decrease in the workability in the next step of the production, and possibility of danger by static discharge during unwinding of the film from the roll, are caused by these problems. The film is occasionally folded, and commercial value of the film is damaged.

SUMMARY OF THE INVENTION

The present invention accordingly has an object to provide a hard coat film the surface of which can be treated easily and has excellent slipping property both between coated surfaces and between a coated surface and a surface having no treatment, and a process for producing the hard coat film.

As the results of the extensive studies by the present inventors, it was discovered that a hard coat film having both an easily slipping property of the coated surface and a high hardness could be obtained when a plastic film was coated with an ultraviolet light curable resin into which a polyester resin was mixed together, and then the coated resin was cured. The present invention was completed on the basis of the discovery.

Thus, the present invention provides a hard coat film having an easily slipping property which comprises a plastic film and a hard coating layer of 1 to 15 μm thickness made from a resin of an ultraviolet light curable type resin on the plastic film, wherein the hard coating layer contains particles of a high molecular weight polyester resin dispersed therein and the surface of the hard coating layer is provided with 3 to 200 protrusions of a diameter of 0.05 to 3 μm and a height of 0.01 to 2 μm per 100 μm$^2$ of the surface.

The present invention also provides a process for producing a hard coat film having an easily slipping property which comprises coating a plastic film with a coating material which comprises an ultraviolet light curable resin, a high molecular weight polyester resin, and a solvent, and contains 0.1 to 20 parts by weight of the high molecular weight polyester resin per 100 parts by weight of the ultraviolet light curable resin, removing the solvent from the coated layer by vaporization, curing the coated layer by irradiation with ultraviolet light, and forming a hard coating layer having protrusions of a diameter of 0.05 to 3 μm and a height of 0.01 to 2 μm at the surface thereof.

Other and further objects, features and advantages of the invention will appear more fully from the following description.

DETAILED DESCRIPTION OF THE INVENTION

Figure 1:
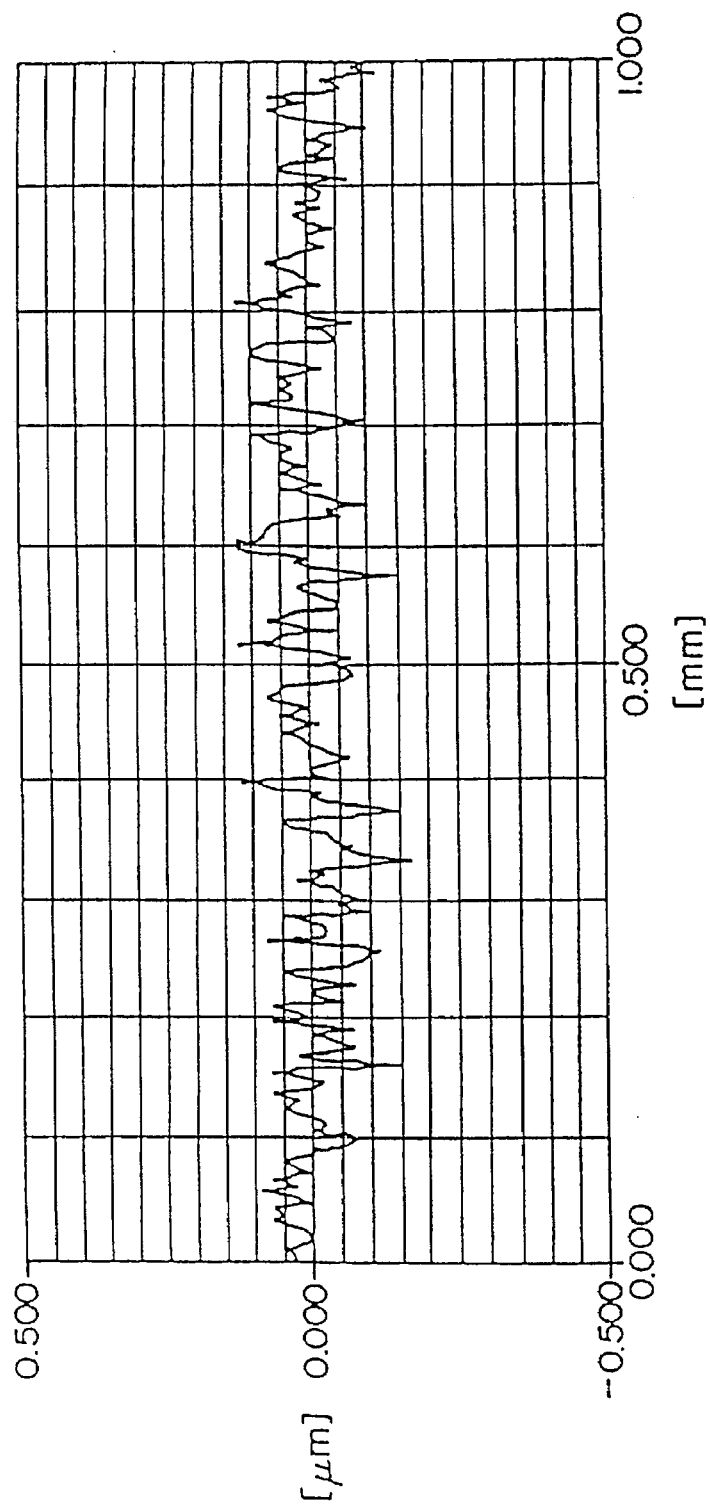
FIG. 1 exhibits a curve showing roughness of the surface of the hard coat film of the present invention.

The plastic film used in the present invention is not particularly limited, and a plastic film having a glass transition temperature of 20° C. or higher, preferably 50° C. or higher, can be used. Examples of such plastic film include films of polyethylene terephthalate, triacetylcellulose, polymethyl methacrylate, polycarbonates, polystyrene, polysulfones, and the like. The plastic film may be used, after the film is prepared, without any treatment or with a treatment, such as corona discharge, metal vapor deposition, or the like, on one or both surfaces thereof.

The resin of an ultraviolet light curable type resin used in the present invention is not particularly limited, and any resin providing a coating layer having a pencil hardness of H or more by the ultraviolet light curing can be used according to desire. Examples of an ultraviolet light curable type resin include polyfunctional acrylate resins, such as acrylic esters or methacrylic esters of polyfunctional alcohols, polyfunctional urethane acrylate resins synthesized from a diisocyanate, a polyhydric alcohol, and a hydroxyalkyl ester of acrylic acid or methacrylic acid, and the like. Monofunctional monomers, such as vinyl pyrrolidone, methyl methacrylate, styrene, and the like, may be added to the polyfunctional resin and copolymerized together, if necessary. The ultraviolet light curable type resin is generally used in the form in which a photopolymerization initiator is added to the resin. As the photopolymerization initiator, conventional compounds which generate radicals by absorbing ultraviolet light can be used without any restriction. Examples of the photopolymerization initiator include various types of benzoin, phenyl ketone, benzophenone, and the like. The photopolymerization initiator is generally added in an amount of 1 to 5 parts by weight per 100 parts by weight of the ultraviolet light curable resin.

The high molecular weight polyester resin used in the present invention is an amorphous saturated polyester resin which is obtained by polymerizing a dihydric alcohol and a dicarboxylic acid and can be dissolved in a solvent in which the resin of an ultraviolet light curing type is also dissolved. Examples of the dihydric alcohol which can be used for the preparation of the polyester resin include ethylene glycol, propylene glycol, 1,3-butanediol, 1,4-butanediol, 1,6-hexanediol, diethylene glycol, neopentyl glycol, 1,4-cyclohexanedimethanol, hydrogenated bisphenol A, and the like. Examples of the dicarboxylic acid which can be used for the preparation of the polyester resin include isophthalic acid, terephthalic acid, adipic acid, phthalic anhydride, tetrahydrophthalic anhydride, hexahydrophthalic anhydride, and the like. An alcohol which has three or more hydroxy groups, such as trimethylolpropane and pentaerythritol, and a carboxylic acid which has three or more carboxylic groups, such as trimellitic anhydride and pyromellitic arthydride, may be copolymerized within the range that the solubility to solvents is not lost. The molecular weight of the polyester resin used in the present invention is from 5,000 to 50,000, preferably from 8,000 to 30,000. When the molecular weight of the polyester resin is less than 5,000, it is difficult to disperse the polyester resin in the hard coating layer in the form of particles of a suitable size. When the molecular weight of the polyester resin is more than 50,000, solubility of the polyester resin in solvents is decreased. Therefore, a molecular weight outside of the specified range is not preferable.

The ultraviolet light curable type resin and the high molecular weight polyester resin are used in the present invention in such relative amounts that 0.1 to 20 parts by weight, preferably 0.2 to 10 parts by weight, more preferably 0.5 to 5 parts by weight, of the high molecular weight polyester resin is used per 100 parts by weight of the ultraviolet light curable type resin. When the amount of the high molecular weight polyester resin is less than 0.1 parts by weight per 100 parts by weight of the ultraviolet light curable resin, good slipping property of the hard coat film is not obtained. When the amount of the high molecular weight polyester resin is more than 20 parts by weight per 100 parts by weight of the ultraviolet light curable resin there arises the possibility that strength of the hard coat film is decreased and the haze value is increased. Therefore, an amount of the high molecular weight polyester resin outside of the specified range is not preferable. However, a film having a high haze value may be prepared by positively making use of the property that the haze value is increased by particles of a high molecular weight polyester resin, and used as an anti-dazzling film.

In the present invention, the ultraviolet light curable type resin, the photo-polymerization initiator, and the high molecular weight polyester resin are dissolved in a solvent common to these materials, and a coating material is prepared. The solvent used is not particularly limited. Examples of the solvent include alcohol solvents, such as ethyl alcohol, isopropyl alcohol, and the like; ester solvents, such as ethyl acetate, butyl acetate, and the like; ether solvents, such as dibutyl ether, ethylene glycol monoethyl ether, and the like; ketone solvents, such as methyl isobutyl ketone, cyclohexanone, and the like; and aromatic hydrocarbon solvents, such as toluene, xylene, solvent naphtha, and the like. The solvent may be used singly or as a mixture of two or more types. The concentration of the resin components in the coating material can be suitably selected by considering a viscosity appropriate to a coating method adopted and the like other factors. The total amount of the of an ultraviolet light curable resin, the photo-polymerization initiator, and the high molecular weight polyester resin in the coating material is generally 20 to 80% by weight. Other conventional additives for coating materials, such as a silicone leveling agent and the like, may be added to the coating material, if necessary.

In the present invention, the coating material thus prepared is applied to the plastic film for coating. The method of the coating is not particularly limited, and a method which was heretofore known, such as the bar coating method, the gravure coating method, the reverse coating method, and the like, may be used. The applied coating material is treated in the next drying process, and the solvent is removed by vaporization. In this process, the high molecular weight polyester resin which has been homogeneously dissolved in the coating material is separated from the ultraviolet light curable resin in the coating layer in the form of fine particles. The plastic film having the dried coating layer is irradiated with ultraviolet light. The resin of an ultraviolet light curable resin is cured by crosslinking, and a hard coating layer is formed. In the process of curing, the fine particles of the high molecular weight polyester resin are fixed in the hard coating layer, and form protrusions at the surface of the hard coating layer. The protrusion at the surface of the hard coating layer has a diameter of 0.05 to 3 μm, preferably 0.05 to 2 μm, more preferably 0.1 to 1 μm, and a height of 0.01 to 2 μm, preferably 0.05 to 1 μm, more preferably 0.05 to 0.5 μm. The number of the protrusion is 3 to 200, preferably 10 to 100, more preferably 20 to 80, per 100 $\mu m^2$ of the surface of the plastic film. When the diameter of the protrusion at the surface of the hard coating layer is less than 0.05 μm, a good slipping property cannot be obtained. When the diameter of the protrusion is more than 3 μm, the slipping property is not increased to the degree expected from the increase in the diameter, but the haze value is increased. Therefore, a diameter of the protrusion outside of the specified range is not preferable. When the height of the protrusion at the surface of the hard coating layer is less than 0.01 μm, a good slipping property cannot be obtained. When the height of the protrusion is more than 2 μm, the slipping property is not increased to the degree expected from the increase in the height, but the haze value is increased. Therefore, a height of the protrusion outside of the specified range is not preferable. When the number of the protrusion at the surface of the hard coating layer is less than 3 per 100 $\mu m^2$ of the surface of the plastic film, a good slipping property cannot be obtained. When the number of the protrusion is more than 200 per 100 $\mu m^2$ of the surface of the plastic film, the slipping property is not increased to the degree expected from the increase in the number of the protrusion, but the haze value is increased. Therefore, a number of the protrusion outside of the specified range is not preferable.

The hard coat film on the present invention has a high hardness of the surface, an excellent durability, and an excellent slipping property both between a coated surface and a surface having no treatment and between coated surfaces. Because of these properties, the hard coat film has an excellent workability in the processing, and advantageously used as a film for windows, a membrane switch, a protecting plate for displays, and the like. Recently, hard coat films are frequently used as protecting plates for displays. Hard coat films are also used after being treated by an additional process, such as vapor deposition and the like. The hard coat film of the present invention can be advantageously used in such applications.

To summarize the advantages obtained by the present invention, the hard coat film has a low haze value, a good transparency, an excellent resistance to scratch, a low kinematic friction coefficient, and an excellent slipping property both between coated surfaces and between a coated surface and a surface having no treatment.

EXAMPLES

The invention will be understood more readily with reference to the following examples; however, these examples are intended to illustrate the invention and are not to be construed to limit the scope of the invention.

In the examples and the comparative examples, properties of the hard coat film were measured by the following methods.

(1) Transmittance of light and haze value

The transmittance of light and the haze value were measured according to Japanese Industrial Standard K 7105 by using a haze meter produced by Nippon Denshoku Kogyo Co., Ltd.

(2) Resistance to scratch

The resistance to scratch was measured by brushing a coated surface with steel wool No.0000 10 times by hands, and formation of scratches was visually observed. Result of the evaluation is expressed as following:

o: no scratches formed x: scratch formed (3) Kinematic friction coefficient

The kinematic friction coefficient between a coated surface and a surface having no treatment was measured according to Japanese Industrial Standard P 8147 except that the load was 300 g and the speed of movement was 100 mm/minute.

(4) Slipping property of a film

Two sheets of film were put together and rubbed to each other by hands. Result of the evaluation of the slipping property is expressed as following. This test was performed between coated surfaces and between a coated surface and a surface having no treatment.

⊚: very smooth slipping o: smooth slipping

Δ: slipping possible with significant resistance x: no slipping

Examples 1 to 3 and Comparative Examples 1 and 2

To 100 parts by weight of an acrylic resin containing a photo-polymerization initiator [a product of Dainichi Seika Kogyo Co., Ltd.; Seikabeam EXF-01J], a polyester resin [a product of Toyobo Co., Ltd.; Bylon 200; molecular weight 15,000 to 20,000] was added in an amount shown in Table 1. A mixed solvent containing toluene and methyl ethyl ketone (MEK) in 8:2 ratio was added to the mixture in such an amount that the concentration of the solid is 50% by weight, and the resins were dissolved homogeneously by stirring to prepare a coating material.

The prepared coating material was applied to a polyester film [a product of Dia Foil Hoechst Co., Ltd.; O300E; thickness, 125 μm] by using a Mayer bar in such an amount that the coated layer had a thickness of 5 μm. The coated film was dried at 80° C. for 1 minute, and cured by irradiating ultraviolet light (quantity of light: 300 mJ/cm$^2$) by using an ultraviolet light irradiation apparatus [a product of Ai Graphics Co., Ltd.; the type UB042-5AM-W].

Results of the evaluation of the hard coat film are shown in Table 1.

The results show that the hard coat film of the present invention in Examples 1 to 3 had a low haze value and good transparency, was not easily scratched by the test of resistance to scratch using steel wool, and showed a low kinematic friction coefficient and good slipping property of the film between the coated surfaces and between the coated surface and the surface having no treatment. In contrast, the hard coat film in Comparative Example 1 having the polyester resin in an amount lower than the specified range showed inferior slipping property of the film between coated surfaces even though it showed good transparency. The hard coat film in Comparative Example 2 having the polyester resin in a amount higher than the specified range was inferior in that it showed lower resistance to scratch and a higher haze value even though it showed good slipping property.

The surface roughness of the hard coat film in Example 2 was measured by using an apparatus of measuring roughness of a surface (a product of Meishin Koki Co., Ltd.; the type SAS-2010]. FIG. 1 exhibits the curve showing roughness of the surface thus obtained. This result shows that protrusions of an average height of about 0.2 μm were present on the surface of the hard coat film in Example 2. It was also shown by an electron micrograph of the surface that about 50 protrusions of an average diameter of about 0.4 μm were present per 100 μm$^2$ of the surface.

Comparative Example 3

A hard coat film was prepared by using fine particles of silica as the inorganic filler in place of the polyester resin.

To 100 parts by weight of an acrylic resin containing a photo-polymerization initiator [a product of Dainichi Seika Kogyo Co., Ltd.; Seikabeam EXF-01J], 0.5 parts by weight of fine particles of silica [a product of Nippon Shokubai Co., Ltd.; Seehostar KE-P150] were added. Toluene in an amount of 80 parts by weight was added to the mixture as the solvent, and a coating material in which the fine particles of silica were uniformly dispersed was prepared by stirring.

The prepared coating material was applied to a polyester film [a product of Dia Foil Hoechst Co., Ltd.; O300E; thickness, 125 μm] by using a Mayer bar in such an amount that the coated layer had a thickness of 5 μm. The coated film was dried at 80° C. for 1 minute, and cured by irradiating ultraviolet light (quantity of light: 300 mJ/cm$^2$) by using an ultraviolet light irradiation apparatus [a product of Ai Graphics Co., Ltd.; the type UB042-5AM-W].

Results of the evaluation of the hard coat film are shown in Table 1.

The results in Table 1 show that the hard coat film prepared in Comparative Example 3 by using the inorganic filler had a high haze value and an insufficient slipping property. Appearance of the surface of the coating layer also showed damages by the fine particles of silica.

Comparative Example 4

A hard coat film was prepared by using a silicone additive in place of the polyester resin.

To 100 parts by weight of an acrylic resin containing a photo-polymerization initiator [a product of Dainichi Seika Kogyo Co., Ltd.; Seikabeam EXF-01J], 0.2 parts by weight of a silicone additive [a product of Toray Dow Corning Silicone Co., Ltd.; SH-28PA] were added. Toluene in an amount of 80 parts by weight was added to the mixture as the solvent, and a coating material in which the silicone additive was uniformly dispersed was prepared by stirring.

The prepared coating material was applied to a polyester film [a product of Dia Foil Hoechst Co., Ltd.; O300E; thickness, 125 μm] by using a Mayer bar in such an amount that the coated layer had a thickness of 5 μm. The coated film was dried at 80° C. for 1 minute, and cured by irradiating ultraviolet light (quantity of light: 300 mJ/cm$^2$) by using an ultraviolet light irradiation apparatus [a product of Ai Graphics Co., Ltd.; the type UB042-5AM-W].

Results of the evaluation of the hard coat film are shown in Table 1.

The results in Table 1 show that the hard coat film prepared in Comparative Example 4 by using the silicone additive showed inferior slipping property between the coated surfaces even though the slipping property between the coated surface and the surface without coating was good.

Example 4

A hard coat film was prepared by using a triacetylcellulose film as the base film.

To 100 parts by weight of a urethane acrylate resin [a product of Kyoeisha Kagaku Kogyo Co., Ltd.; UA-306-H], 2.0 parts by weight of a polyester resin [a product of Toyobo Co., Ltd.; Bylon 300; molecular weight, 20,000 to 25,000] was added. To the mixture, 4 parts by weight of a photo-polymerization initiator [a product of Nippon Ciba Geigy Co., Ltd.; IRGACURE 184], 0.03 parts by weight of a silicone additive [a product of Toray Dow Corning Silicone Co., Ltd.; SH-28PA], and 100 parts by weight of a mixed solvent containing toluene and MEK in a 8:2 ratio were added and dissolved homogeneously by stirring to prepare a coating material.

The prepared coating material was applied to a triacetylcellulose film [a product of Fuji Photofilm Co., Ltd.; FT-UV80; thickness, 80 μm] by using a Mayer bar in such an amount that the coated layer had a thickness of 5 μm. The coated film was dried at 80° C. for 1 minute, and cured by irradiating ultraviolet light (quantity of light: 300 mJ/cm$^2$) by using an ultraviolet light irradiation apparatus [a product of Ai Graphics Co., Ltd.; the type UB042-5AM-W].

Results of the evaluation of the hard coat film are shown in Table 1.

The results show that the hard coat film of the present invention in Example 4 had good resistance to scratch as well as good transparency and slipping property.

the plastic film, wherein the hard coating layer contains particles of a polyester resin having a weight average molecular weight of at least 5,000 dispersed therein, and the surface of the hard coating layer is provided with 3 to 200 protrusions of a diameter of 0.05 to 3 μm and a height of 0.01 to 2 μm per 100 μm$^2$ of the surface.

2. A hard coat film according to claim 1, wherein the surface of the hard coating layer is provided with 20 to 80 protrusions of a diameter of 0.1 to 1 μm and a height of 0.05 to 0.5 μm per 100 μm$^2$ of the surface.

3. A hard coat film according to claim 1, wherein the plastic film is made of a plastic selected from the group consisting of polyethylene terephthalate, triacetylcellulose, polymethyl methacrylate, polycarbonates, polystyrene, and polysulfones.

4. A hard coat film according to claim 1, wherein the polyester resin is an amorphous saturated polyester resin obtained by polymerizing a divalent alcohol and a divalent carboxylic acid.

5. A hard coat film according to claim 4, wherein the polyester resin has a weight average molecular weight ranging from 5,000 to 50,000.

6. A process for producing a hard coat film having an easily slipping property comprising coating a plastic film having a glass transition temperature of at least 20° C. with a coating material which comprises an ultraviolet light curable acrylic resin containing a photo-polymerization initiator, a polyester resin having a weight average molecular weight of at least 5,000, and a solvent, said coating material containing from 0.1 to 20 parts by weight of the polyester resin per 100 parts by weight of the ultraviolet light curable acrylic resin, removing the solvent from the coated layer by vaporization, curing the coated layer by irradiation with ultraviolet light, and forming a hard coating layer having protrusions of a diameter of 0.05 to 3 μm and a height of 0.01 to 2 μm at the surface thereof.

7. A process for producing a hard coat film according to claim 6, wherein the coating material contains from 0.5 to 5 parts by weight of the polyester resin per 100 parts by weight of the ultraviolet light curable resin.

TABLE 1

| | additive (part by weight)[1] | | | total transmittance of light (%) | haze value (%) | resistance to scratch | kinematic friction coefficient | slipping property of the film | |
|---|---|---|---|---|---|---|---|---|---|
| | polyester resin | fine particles of silica | silicone | | | | | coated surface/ coated surface | coated surface surface having no treatment |
| Example 1 | 0.2 | — | — | 90.1 | 1.2 | ○ | 0.7 | ⊚ | ⊚ |
| Example 2 | 3.0 | — | — | 89.9 | 1.7 | ○ | 0.6 | ⊚ | ⊚ |
| Example 3 | 9.0 | — | — | 90.0 | 2.6 | ○ | 0.5 | ⊚ | ⊚ |
| Comparative Example 1 | 0.05 | — | — | 90.0 | 1.0 | ○ | 2.0 | x | ○ |
| Comparative Example 2 | 30.0 | — | — | 89.8 | 7.2 | x | 0.8 | ⊚ | ⊚ |
| Comparative Example 3 | — | 0.5 | — | 89.5 | 3.5 | ○ | 1.3 | Δ | ○ |
| Comparative Example 4 | — | — | 0.2 | 90.0 | 1.0 | ○ | 1.2 | x | ⊚ |
| Example 4 | 2.0 | — | 0.03 | 89.9 | 0.4 | ○ | 0.6 | ⊚ | ⊚ |

[1]The amount of addition per 100 parts by weight of the acrylic resin containing the photo-polymerization initiator

What is claimed is:

1. A hard coat film having an easily slipping property which comprises a plastic film having a glass transition temperature of at least 20° C., and a hard coating layer of 1 to 15 μm thickness made from a photo-polymerization initiator-containing ultraviolet light curable acrylic resin on 8. A process for producing a hard coat film according to claim 6, wherein the plastic film is made of a plastic selected from the group consisting of polyethylene terephthalate, triacetylcellulose, polymethyl methacrylate, polycarbonates, polystyrene, and polysulfones.

9. A process for producing a hard coat film according to claim 6, wherein the polyester resin is an amorphous saturated polyester resin obtained by polymerizing a divalent alcohol and a divalent carboxylic acid.

10. A process for producing a hard coat film according to claim 9, wherein the polyester resin has a weight average molecular weight ranging from 5,000 to 50,000.

* * * * *